US012502641B2

(12) United States Patent
Obluda et al.

(10) Patent No.: US 12,502,641 B2
(45) Date of Patent: Dec. 23, 2025

(54) PROCESS FOR REDUCING EMISSIONS FROM THE REFINING OF CRUDE OIL TO FINISHED TRANSPORTATION FUELS

(71) Applicants: Gerard Obluda, Lake Charles, LA (US); Michael F. Milam, Waco, TX (US)

(72) Inventors: Gerard Obluda, Lake Charles, LA (US); Michael F. Milam, Waco, TX (US)

(*) Notice: Subject to any disclaimer, the term of this patent is extended or adjusted under 35 U.S.C. 154(b) by 593 days.

(21) Appl. No.: 18/045,667

(22) Filed: Oct. 11, 2022

(65) Prior Publication Data

US 2024/0115997 A1  Apr. 11, 2024

(51) Int. Cl.
*B01D 53/75* (2006.01)
*B01D 53/14* (2006.01)
*B01D 53/52* (2006.01)
*B01D 53/78* (2006.01)

(52) U.S. Cl.
CPC ......... *B01D 53/75* (2013.01); *B01D 53/1475* (2013.01); *B01D 53/52* (2013.01); *B01D 53/78* (2013.01); *B01D 2252/204* (2013.01)

(58) Field of Classification Search
None
See application file for complete search history.

(56) References Cited

U.S. PATENT DOCUMENTS

| 11,180,705 | B2 | 11/2021 | Obluda | |
|---|---|---|---|---|
| 11,613,710 | B2 * | 3/2023 | Roe | C10G 19/02 210/759 |

| 2008/0011643 | A1 | 1/2008 | Lenglet |
|---|---|---|---|
| 2017/0058721 | A1 | 3/2017 | Noureldin |
| 2017/0096609 | A1 | 4/2017 | Eizenga |
| 2018/0155633 | A1 | 6/2018 | Al-Ghamdi |
| 2018/0155641 | A1 | 6/2018 | Al-Ghamdi |
| 2018/0155643 | A1 | 6/2018 | Al-Ghamdi |
| 2019/0093025 | A1 | 3/2019 | Wohalbi |

(Continued)

OTHER PUBLICATIONS

Eliminating Well Site Emissions Associated with Loading Trucks; https://ecovaporrs.com/eliminating-well-site-emissions-associated-with-loading-trucks: Sep. 15, 2022, 10:27 AM.

(Continued)

*Primary Examiner* — Colin W. Slifka
(74) *Attorney, Agent, or Firm* — Nick Guinn; Gunn, Lee & Cave, P.C.

(57) ABSTRACT

The invention is a system and method for reducing Scope 1 and Scope 2 CO2 emissions as well as criteria pollutant emissions from a newly constructed crude oil refinery. In preferred embodiments, the present invention processes light crude oil, uses post-combustion CO2 capture on all of the fired sources associated with Scope 1 CO2 emissions; uses on-site power generation that ties in post-combustion CO2 capture to the rest of the facility to fully capture the facility Scope 2 CO2 emissions; uses caustic treating to make refinery fuel gas H2S-free and thus furnace emissions will be SOX-free; uses emerging burner technology that significantly reduces NOX emissions below generally applied technology in the refining industry; uses available VOC capture technology on loading and unloading operations; and uses on-site solar generation to supplement power generation with zero emission supplemental power.

16 Claims, 2 Drawing Sheets

(56) References Cited

U.S. PATENT DOCUMENTS

2019/0390120 A1 12/2019 Eizenga
2020/0181504 A1 6/2020 Myllyoja

OTHER PUBLICATIONS

Great Southern Flameless—Great Southern Technologies; https://greatsoutherngroup.com/flameless-heaters/; Sep. 15, 2022, 10:30 AM.
Ultra Low NOx Emission Burners, https://www.alzefa.com/ultra-low-nox-burners; Sep. 15, 2022, 10:32 AM.

* cited by examiner

PROCESS FOR REDUCING EMISSIONS FROM THE REFINING OF CRUDE OIL TO FINISHED TRANSPORTATION FUELS

CROSS REFERENCES TO RELATED APPLICATION

Not applicable.

FEDERALLY SPONSORED RESEARCH OR DEVELOPMENT

Not applicable.

BACKGROUND OF THE INVENTION

1. Field of the Invention

This invention relates to crude oil refining. This invention reduces all Greenhouse Gas (GHG) and most criteria pollutant emissions to significantly reduced levels compared to current and permitted crude oil refineries. The invention uses specific crude types along with available technologies while applying and configuring them differently than they can be applied or configured in existing, conventional oil refineries.

2. Description of the Related Art

U.S. Pat. No. 11,180,705 (the '705 patent) is incorporated herein by reference. The '705 patent provides a process for upgrading ultralight fluid to finished products, said fluid consisting of these typical properties: API gravity between 46 and 58; sulfur content less than 0.1%; Reid vapor pressure between 5 and 15 psig; originating from reservoirs using hydraulic fracturing techniques. The finished products include ultra-low sulfur diesel, meeting conventional industry specifications; low sulfur marine gas oil, meeting conventional industry specifications; low sulfur marine fuel oil, meeting conventional industry specifications; and regular gasoline, meeting conventional industry specifications.

The present invention provides systems and processes for reducing emissions from refineries for ultralight fluids such as those disclosed in the '705 patent. More specifically, in certain embodiments, the present invention uses systems and processes for reducing emissions from off gas and vent gas at such a refinery.

Current refineries emit certain, permitted levels of criteria pollutants as identified by regulatory agencies (e.g., the Environmental Protection Agency or EPA). The emission levels are based upon available technologies that regulatory agencies deem reasonable to employ at the time of permitting. The list of criteria pollutants includes nitrogen dioxide (NOX), sulfur dioxide (SOX), carbon monoxide (CO), particulate matter (PM), ground-level ozone, and lead. There are many other limitations on refinery emissions to the environment, including volatile organic compounds (VOC).

In addition to permitted pollutants, refineries also emit a large amount of greenhouse gases (GHG), in particular carbon dioxide (CO2). This includes not only Scope 1 emissions (direct from the refining), but also Scope 2 emissions (indirect from power and hydrogen usage in refining). More specifically, Scope 1 emissions are direct greenhouse (GHG) emissions that occur from sources that are controlled or owned by an organization (e.g., emissions associated with fuel combustion in boilers, furnaces, vehicles). Scope 2 emissions are indirect GHG emissions associated with the purchase of electricity, steam, heat, or cooling. Although scope 2 emissions physically occur at the facility where they are generated, they are accounted for in an organization's GHG inventory because they are a result of the organization's energy use. These emissions are not currently part of the permitting process for a facility. Historically, Greenhouse Gases (GHG) have not been regulated. However, as global warming has become evident, the requirement to reduce or eliminate GHG will likely become mandatory.

Crude oil refining upgrades a wide variety of crude oils to finished transportation fuels. Many processes are required to perform these upgrades and the available technologies employed in the industry have associated emissions. Areas include fired furnaces, loading/unloading facilities, hydrogen generation, amine treating, and power generation. Refineries have been built over many decades and have a wide range of emission control technologies. As a result, traditional refineries are often a patch work of countless operating units from various vintages.

There are meaningful differences between heavy sour crude oil from light, sweet crude oil. Heavy, sour crude is a type of crude oil known for its relatively high sulfur content. The presence of sulfur makes oil more difficult and costly to refine, causing sour crude to be viewed as a less desirable form of crude oil. When the total sulfur level in the oil is more than 0.5% (by weight), the oil is called "sour". By contrast, crude oil with less than 0.5% sulfur is considered sweet per the New York Mercantile Exchange. Sweet crude oil contains small amounts of hydrogen sulfide and carbon dioxide. High-quality, low-sulfur crude oil is commonly used for processing into gasoline and is in high demand, particularly in industrialized nations (but typically not the United States). Light sweet crude oil is the most sought-after version of crude oil as it contains a disproportionately large fraction that is directly processed (fractionation) into gasoline (naphtha), kerosene, and high-quality diesel (gas oil). For reference, H2S is hydrogen sulfide. H2S is a colorless, flammable, extremely hazardous gas that occurs naturally in crude petroleum, natural gas, and hot springs.

With a heavy or sour crude, more upgrading processes are required. These include Fluid Catalytic Cracking (FCC), Delayed Coking, Claus Sulfur Processing, Amine Treating, Steam Methane Reforming, and large power consumption. With the requirement of these advanced processes in a refinery, there is a sizable increase in the amount of emissions per barrel of crude processed to produce transportation fuels. The differences in operating units and expense, etc. are discussed in the '705 patent.

With a light, sweet crude as contemplated by this invention, there are fewer upgrading processes required, and emissions from these processes are more easily controlled by the technologies employed with this invention.

The present invention is used in connection with refineries wherein sweet crude is the refinery feedstock. The US currently exports the majority of the lightest, sweetest crude because the US refining industry is tooled to process heavier, more sour crudes. The US currently exports over 3 million barrels per day of light sweet, and imports more than 7 million barrels per day of heavier, sour crudes, per US EIA data in 2022. The light, sweet crude contemplated for this invention is typified by West Texas Light (WTL) crude that is widely traded and tracked with public information. The WTL crude is typically in the 45 to 50 API range, with sulfur content around 0.1 wt %. In addition to WTL as a typical crude, there is a large abundance of extra-light, sweet crudes being exported from the Permian Basin (West Texas Condensate (WTC)) and the EagleFord Basin (EF Condensate)

that are widely exported from the US due to their mismatch with current US refining assets to upgrade them to finished products. These extra-light crudes typically have an API of greater than 50 API and a sulfur content less than 0.1 wt % sulfur. The lighter and lower sulfur feeds are ideal for the invention being contemplated in order to further minimize emissions.

The present invention also reduces the need to export light sweet crude oil.

BRIEF SUMMARY OF THE INVENTION

The invention is a system and method for reducing all Scope 1 and Scope 2 CO2 emissions as well as criteria pollutant emissions from a crude oil refinery.

The present invention is superior to other known processes because it: (1) processes a specific type of crude oil different than most other refineries; (2) uses post-combustion CO2 capture on all of the fired sources associated with Scope 1 CO2 emissions; (3) uses on-site power generation that ties in post-combustion CO2 capture to the rest of the facility to fully capture the facility Scope 2 CO2 emissions; (4) uses caustic treating to make refinery fuel gas H2S-free and thus furnace emissions will be SOX-free; 5) uses emerging burner technology that significantly reduces NOX emissions below generally applied technology in the refining industry; (6) uses available VOC capture technology on loading and unloading operations; and (7) uses on-site solar generation to supplement power generation with zero emission supplemental power.

While the emission reduction components are related and complement each other, the present invention does not require the complete implementation of all the identified components to achieve significant emission reductions. The net impact of the combined components is a greater than 95% reduction in both GHG emissions and criteria pollutant emissions on a per barrel basis versus public data emissions from average US refineries.

Certain embodiments of the invention include: (1) using the alternative NOX-reduction method of 'flameless' technology as provided by Great Southern Flameless (GSF); (2) VOC reduction technology from ECO Vapor; and (3) using on-site solar power generation to supplement other power sources.

EcoVapor describes challenges associated with venting of vapors in refineries and solutions that can be implemented to mitigate venting. One solution involves using an oxygen treatment solution. EcoVapor describes benefits of capturing and treating tank vapor and truck loading using an oxygen treatment solution: lower emissions, reduced flaring, and improved safety. With respect to lower emissions, oxygen treatment solution significantly reduces emissions of VOC and methane during truck and rail loadouts. When vented or flared, vapor from truck and rail loading contributes over 10% of permitted VOC tank emissions. With respect to reduced flaring, an oxygen treatment solution leads to lower VOC, NOX, and greenhouse gas emissions from related flaring. With respect to improved safety, oxygen treatment solution captures and treats all tank vapors allowing operators to actively reduce storage tank pressures and to measure and treat oxygen in the vapor stream. See https://ecovaporrs.com/eliminating-well-site-emissions-associated-with-loading-trucks.

Great Southern Technologies provides a technology for flameless combustion in lieu of traditional burners. Flameless combustion technology, also referred to as HITAC (or high temperature air combustion), is often associated with the higher temperature processes of the steel and glass industry. Great Southern discloses technology that creates flameless combustion at radiant flux rates and flue gas temperatures common to refinery process heaters. The technology disclosed by Great Southern permits a wide range of operation (fuel type and turndown) and a wide selection of heater types. That technology offers a conventional process heater design that can also be operated in flameless mode for extreme NOx reduction (down to 3-8 ppm) without an SCR. Flameless heater technology improves efficiency (91%—LHV) significantly increases run lengths, reduces fuel consumption and decreases CO2 greenhouse gases by 10-20%. See https://greatsoutherngroup.com/flameless-heaters/.

Ultra Low NOx Emission Burners are becoming more prevalent—and even required in certain states. Several vendors (e.g., Alzeta Corporation) offer solutions to reduce NOx. For example, Alzeta boasts solutions that each provide less than 7 ppm NOx. Alzeta describes surface-stabilized combustion that provides uniform heating and operates at minimum combustion temperatures: combustion temperatures are minimized by operating lean (lower fuel-to-air ratio). See, e.g., https://www.alzeta.com/ultra-low-nox-burners.

Cogeneration—also known as combined heat and power, distributed generation, or recycled energy—is the simultaneous production of two or more forms of energy from a single fuel source. Cogeneration power plants often operate at 50 to 70 percent higher efficiency rates than single-generation facilities. In practical terms, cogeneration often involves using what would be wasted heat (such as a manufacturing plant's exhaust) to produce additional energy benefit, such as to provide heat or electricity for the building in which it is operating. Cogeneration improves a refinery's financials and environmental impact: recycling the waste heat saves other pollutant-spewing fossil fuels from being burned.

BRIEF DESCRIPTION OF THE SEVERAL VIEWS OF THE DRAWINGS

For an improved understanding of the present invention, and the advantages thereof, reference is made to the following descriptions taken in conjunction with the accompanying figures.

DETAILED DESCRIPTION OF THE INVENTION

The present invention provides a crude oil refining facility that has a 95% reduction in both CO2 emissions and all criteria pollutants as compared to current, average US refineries.

Figure 1:
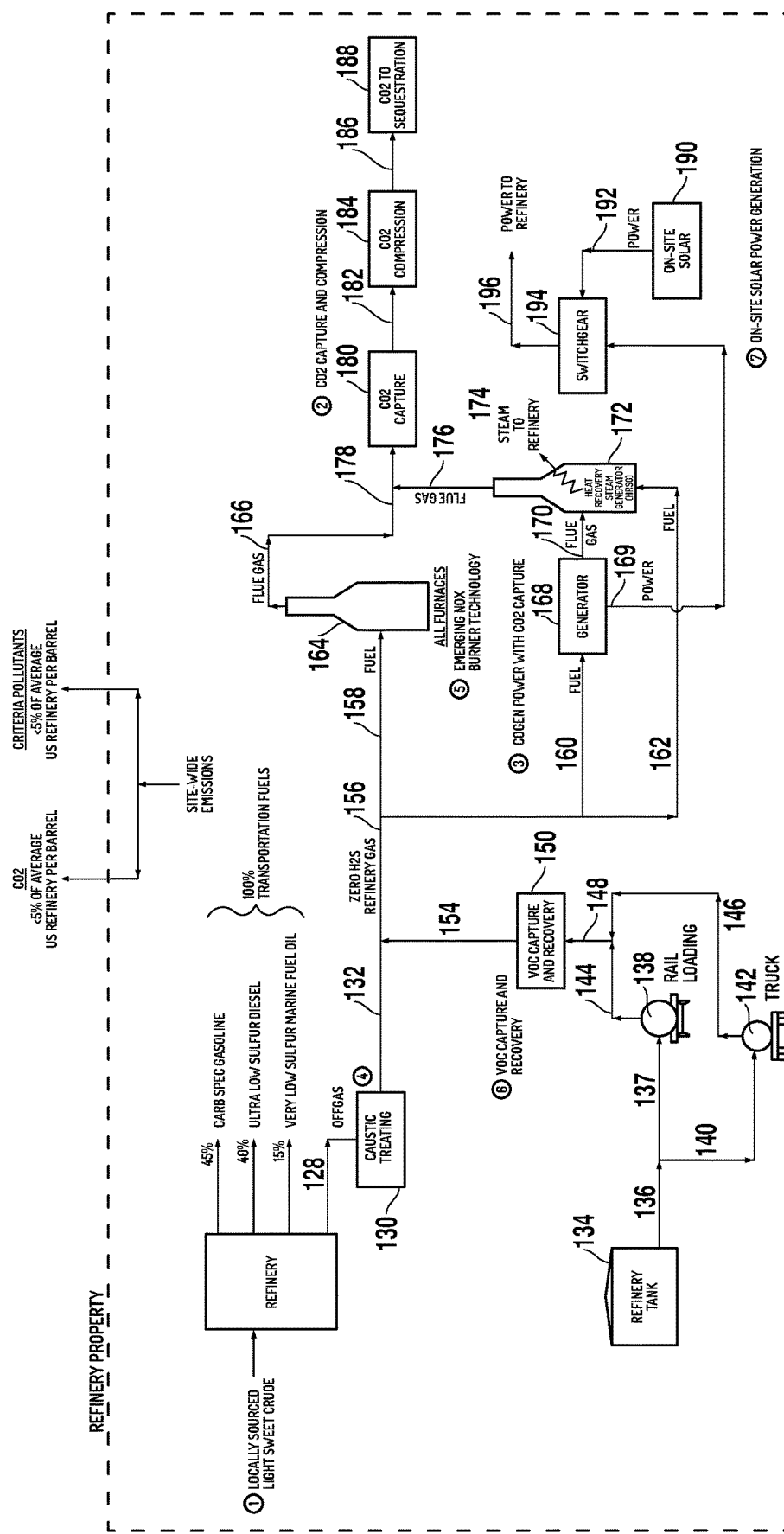
FIG. 1 is a block flow diagram schematic showing the interaction of the major components of the invention.

FIG. 1 illustrates one embodiment of the present invention. This embodiment consists of several operating units, including: a caustic treating unit; a VOC capture and recovery unit; a furnace; a heat recovery steam generator; a generator with switchgear a CO2 capture unit; a CO2 compression unit; and CO2 sequestration into a permitted injection well or to Enhance Oil Recovery (EOR) operations.

A stream 128 of offgas exits a refinery and is directed to a caustic treating unit 130. This embodiment of the invention uses caustic treating of the refinery offgases to remove H2S from the offgas. Caustic treating can be efficiently used here primarily because of the crude-type selection specified in this invention. By using this invention in connection with a refinery for light, sweet crude (more preferably, ultralight crude), the H2S content in the off gases is less than 0.5% by weight (more preferably, less than 0.1% by weight), which is significantly lower than in the off gases of typical oil refineries at 0.5% by weight or higher. The low H2S content allows for the efficient application of caustic in gas treating. Typical refineries (i.e., with higher H2S content in the off gases) must use a regenerative amine treating system to remove H2S from off gas. Amine treating systems leave approximately 100 ppm of H2S in the gas stream. By contrast, caustic treatment can reduce the H2S content to zero ppm. In fact, refineries in the US have had a longstanding allowable level of 162 ppm H2S in fuel gas due to the limitations of amine treating as the standard for refining. Essentially, all H2S in fuel gas is directly converted to the criteria pollutant SOX as emissions from the heater/furnace/boiler/flare where it is combusted. This invention will result in essentially zero SOX emissions based upon treating all H2S-bearing gas streams in the refinery with caustic. This represents a greater than 99.5% reduction in expected SO2 facility emissions per barrel of crude processed into finished products.

The caustic treating unit 130 provides a stream 132 as an output. Stream 132 is a hydrocarbon gas stream with very low concentration of H2S that can now be routed in to the refinery fuel gas system for utilization in the refinery furnaces and steam generators as fuel.

A refinery tank 134 contains light products as discussed herein. The light products leaves the refinery tank 134 in one or more lines 136, which are directed via one or more rail lines 137 to rail vehicles 138 and one or more truck lines 140 to trucks 142.

Typically, at this stage in a refinery, when trucks and rail cars are being loaded from the storage tanks, vapor is displaced (i.e., vented) from the vehicles. This vapor is a mixture of hydrocarbon vapor (i.e., VOCs) and air. In many cases, the vapor is vented directly into the atmosphere, accounting for more than 10% of total VOC emissions from a production site.

To reduce said venting, the displaced vapor is recovered to refinery fuel. Specifically, as shown in FIG. 1, displaced vapor is piped from the rail vehicles via one or more lines 144 and displaced vapor is piped from the trucks via one or more lines 146. The lines 144 and lines 146 are combined into line 148 where they enter a VOC capture and recovery unit 150.

VOC capture technology such as the technology used by EcoVapor is used in connection with storage tanks and also loading and unloading operations. VOC capture technology has not been widely used in refining given that there are no regulatory requirements to capture VOC from tanks or loading/unloading operations; and because major retrofitting would be required in existing, traditional refining facilities. Typically, VOCs are either released into the atmosphere or combusted in a flare. This embodiment of the present invention uses VOC capture technology and uses the VOCs in the fuel system to increase overall refinery energy efficiency. For a typical oil refinery, VOC emissions from the storage tanks and loading/unloading operations accounts for over 30% of site-wide VOC emissions. Implementation of the VOC capture technology is expected to reduce VOC emissions from tanks and loading/unloading operations by over 90% compared to current, permitted operations in other facilities.

An output stream exits the VOC capture and recovery unit 150 via line 154. The stream of vapor post-VOC capture in line 154 is joined with the stream of line 132 to form a zero (or near zero) H2S stream of refinery gas in line 156.

The line 156 subsequently splits to lines 158, 160, 162. Line 158 is fed to furnaces 164. Furnaces 164 output flue gas via line 166.

In this embodiment, one of two technologies are used applied to all furnace burners to significantly reduce NOx emissions (neither of which are currently used at any appreciable level in the refining industry): (1) the flameless burner technology patented by Great Southern and (2) Ultra-Low NOX Burners as provided by multiple vendors (e.g., Alzeta Corporation). The approach is unique for at least two reasons: (1) the technology is not required by regulatory agencies and (2) existing heaters cannot be retrofitted to accommodate the new technologies that have much lower NOx emissions. All new furnace installations will incorporate the potential technology in conjunction with post-combustion CO2 capture. The result is a net reduction in NOx emissions in comparison to existing facilities in the refining industry that utilize older burner technology. The older technology will continue to be widespread until regulatory changes force the complete application of the technologies contemplated for this invention.

By using furnaces that have flameless burners (e.g., Great Southern flameless burners) in the facility furnaces of the present invention, the NOx levels are reduced to less than 10 ppmv of the flue gas. Alternatively, using Ultra-Low NOx burners reduces the NOx levels to less than 15 ppmv of the flue gas. Traditional, existing refinery furnace burners are anywhere from 30 to 60 or higher NOx levels. Existing furnaces are difficult to modify to achieve levels anywhere near these low levels that can be achieved by applying our readily available new technology.

Line 160 containing methane and other light hydrocarbons is fed to a combustion device, either a reciprocating engine or a turbine, which in turn drives an electrical generator 168. The flue gas from 168 is directed to a Heat Recovery Steam Generator (HRSG) 172 that can utilize supplementary firing to generate steam for refinery usage. The combination of 168 and 172 is what is termed Co-Generation, or CoGen. This embodiment of the invention uses Cogeneration (CoGen) power for the facility. By using a CoGen, the flue gas from the CoGen can be captured collectively with the refinery furnace flue gases. This serves to make the power used by the facility a CO2-free source, which is considered a Scope 2 emission associated with any refinery. Additionally, the CoGen generates the steam for the facility, thus eliminating another CO2 source for any refinery (e.g., boilers used for steam generation). As with the furnace locations, the CoGen will be located in close proximity to the CO2 capture unit 180 (discussed below).

Line 162 is fed to the HRSG 172.

The Scope 2 emissions associated with the average US refinery is estimated to be on the order of 50 lbs CO2 per barrel of crude processed to finished products. With implementation of the selected amine-based capture technology on the flue gas from the natural gas-fired CoGen equipment, the Scope 2 emissions are less than 3 pounds of CO2 per barrel of crude processed to finished products.

The CoGen 168 has two outputs: power in line 169 and flue gas in line 170. The flue gas in line 170 is directed to a Heat Recovery Steam Generator that has auxiliary firing. (i.e., HRSG) 172, which outputs steam via line 174 back to the refinery. The HRSG 172 also outputs flue gas via line 176. The flue gas in lines 166 and 176 are joined to form line 178. The flue gas in line 178 is directed to a CO2 capture unit 180. The output of the CO2 capture unit 180 is directed via line 182 to a CO2 compression unit 184. The output of the CO2 compression unit 184 is directed via line 186 to a CO2 sequestration unit 188.

Figure 2:
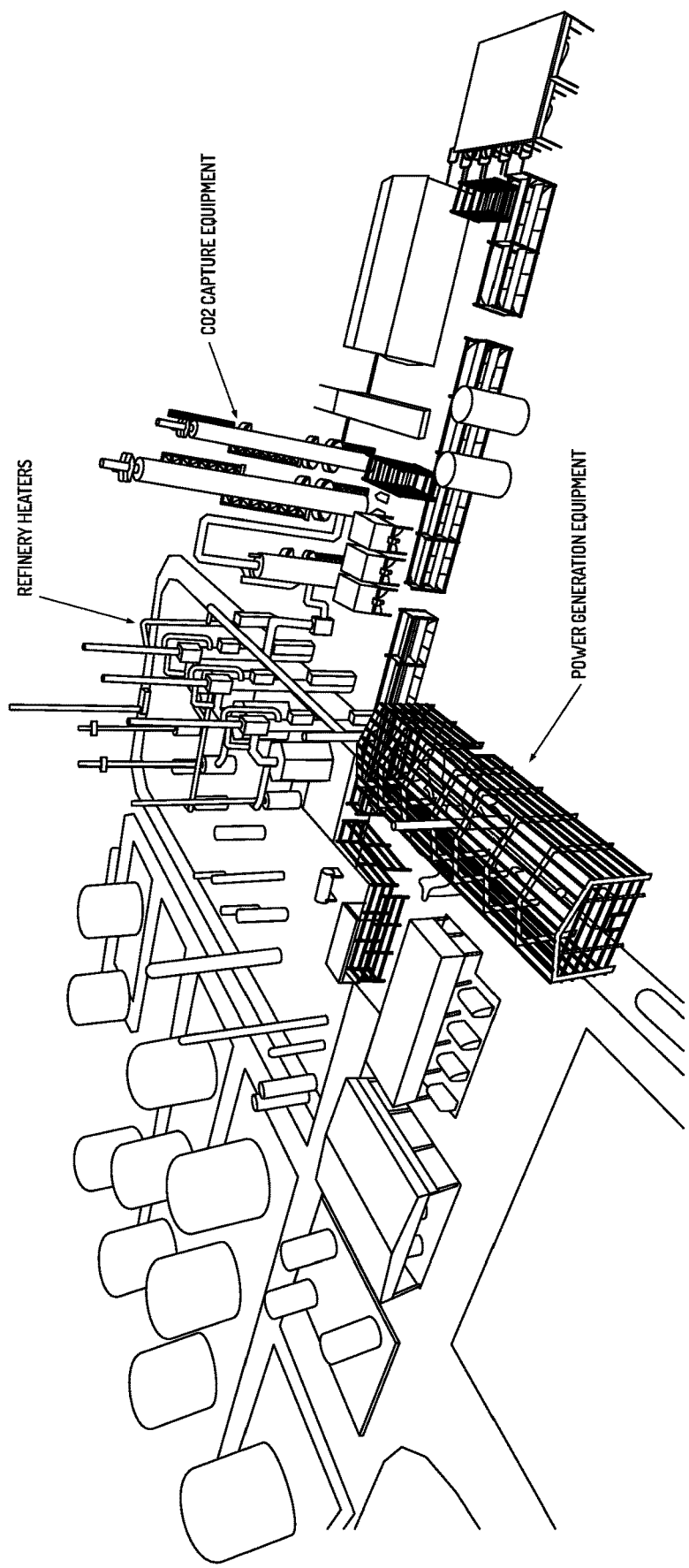
FIG. 2 is a 3D rendering of the site configuration that shows the importance of the layout for the facility.

Carbon capture may be achieved by one of several known carbon capture techniques. In this embodiment, carbon capture is carried out using amine-based CO2 capture technology. This can only be effectively implemented with this invention due to the configuration of the facility. By locating all of the furnaces in close proximity, the flue gases can be much more easily collected for processing in a post-combustion amine CO2 capture unit. Refer to FIG. 2, the 3D layout of the facility, for the typical expected configuration of the refinery furnaces relative to the CO2 capture equipment.

The direct, Scope 1 CO2 emissions from the average US refinery is over 80 pounds of CO2 per barrel of crude produced, per EIA data. With implementation of our selected amine-based CO2 capture technology, the CO2 emissions from the facility for Scope 1 emissions as contemplated in this embodiment of the invention are less than 2 pounds of CO2 per barrel of crude processed to finished products.

CO2 captured from flue gas is compressed to a pressure between 1,500 and 2,200 psi. This step can be carried out using one of several techniques including a multi-stage compressor with interstage cooling, supersonic compression, piston compressors, rotary screw compressors, rotary tooth compressors, blowers, etc.

Carbon sequestration may be carried out in one of several ways, including geologic and biologic sequestration. Geologic carbon sequestration is the process of storing carbon dioxide (CO2) in underground geologic formations. The CO2 is usually pressurized until it becomes a liquid or supercritical fluid, and then it is injected into porous rock formations in geologic basins. This method of carbon storage is also sometimes a part of enhanced oil recovery, otherwise known as tertiary recovery. In enhanced oil recovery, the liquid CO2 is injected into the oil-bearing formation in order to reduce the viscosity of the oil and allow it to flow more easily to the oil well.

This embodiment also includes on-site solar power generation 190, which outputs power via line 192. The power in line 169 and the power in line 192 are directed to a switchgear 194. In this embodiment, power in line 169 and the power in line 192 combine as needed to supply required refinery power demand. Power leaves the switchgear via line 196 back to the refinery.

On-site solar power generation is used as part of the overall facility design to further improve the Scope 2 emission reductions: a small additional improvement based on the CoGen flue gas being subject to CO2 capture. In order to achieve these significant reductions, a unique combination of emission reduction components must be employed.

In some embodiments of this invention, the system and process of the invention uses advanced technology as provided by other patented processes, including: Flameless Burners from Great Southern, Amine-based CO2 capture from BASF OASE Blue, and VOC capture from EcoVapor.

In some embodiments, the construction and implementation uses modular construction techniques. For instance, pumps, exchangers, control valves, and other equipment may be located on modules, while certain reactors, columns, and tanks can be located on field-constructed foundations. Modular construction allows for better control of budget, schedule, and quality. For these reasons, modular construction significantly improves the economics of an overall project utilizing this invention. The use of modular techniques will depend upon equipment sizing. Smaller capacities, i.e. less than 30,000 BPD, will be able to modularize a relatively high percentage of the refinery. Capacities above 30,000 BPD will have a significantly reduced percentage of modularization and require incrementally more field construction.

The present invention is described above in terms of a preferred illustrative embodiment in which a specifically described refining plant and method are described. Those skilled in the art will recognize that alternative constructions of such an apparatus, system, and method can be used in carrying out the present invention. Other aspects, features, and advantages of the present invention may be obtained from a study of this disclosure and the drawings, along with the appended claims.

We claim:

1. A method of reducing air emissions from a refinery comprising the steps of:
   introducing a stream of refinery offgas to a caustic scrubber; and
   feeding a stream of refinery gas to at least one furnace to form a flue gas;
   and subjecting the flue gas from the at least one furnace to amine-based post-combustion CO2 capture.

2. The method of claim 1 further comprising the steps of:
   compressing the CO2 captured from the at least one furnace subjected to amine-based post-combustion CO2 capture; and
   sequestering the compressed CO2.

3. The method of claim 1 further comprising the step of directing a stream of refinery gas to a cogeneration unit.

4. The method of claim 3 further comprising the step of subjecting the flue gas from the cogeneration unit to amine-based post-combustion CO2 capture.

5. The method of claim 4 further comprising the step of recovering a stream of power from the cogeneration unit.

6. The method of claim 5 further comprising the steps of:
   directing the stream of power from the cogeneration unit to a switchgear;
   harnessing a stream of solar-power;
   directing the stream of solar-power to the switchgear.

7. The method of claim 6 further comprising the steps recovering power from the switchgear and directing that power to the refinery.

8. The method of claim 1 further comprising the addition of Ultra-Low NOx burner technologies to be added to the at least one furnace utilized in claim 1.

9. The method of claim 1 further comprising the steps of:
   loading one or more vehicles with gasoline;
   directing the vapor from said loading gasoline to a VOC capture and recovery unit.

10. The method of claim 9 further comprising the step of:
    feeding a stream of refinery gas from the VOC capture and recovery unit to at least one furnace to form a flue gas; and
    subjecting the flue gas from the at least one furnace to amine-based post-combustion CO2 capture.

11. The method of claim 1 further comprising the steps of:
    harnessing a stream of solar-power; and
    directing the stream of solar-power to the refinery.

12. The method of claim 11 further comprising the step of directing the stream of solar-power to a switchgear located at the refinery.

13. The method of claim 1 wherein the stream of refinery offgas is fed from one or more refinery operating units receiving light crude oil or ultra-light crude oil.

14. The method of claim 1, wherein the crude oil refining facility achieves:
- less than 2 pounds of CO2 per barrel of crude processed for Scope 1 emissions;
- less than 3 pounds of CO2 per barrel of crude processed for Scope 2 emissions; and
- greater than 99.5% reduction in SO2 emissions per barrel compared to refineries using amine treating.

15. The method of claim 1, wherein the stream of refinery offgas has API gravity between 46 and 58, and wherein the stream of refinery offgas is not subjected to fluid catalytic cracking, delayed coking, or Claus sulfur processing units.

16. The method of claim 1, further comprising:
- capturing displaced vapors from truck and rail loading operations using VOC recovery technology; and
- directing the captured VOCs to the refinery fuel gas system.

\* \* \* \* \*